(12) United States Patent
Weinert et al.

(10) Patent No.: US 7,049,525 B1
(45) Date of Patent: *May 23, 2006

(54) ADJUSTABLE ROUTING DEVICE FOR ROUTING JUMPERS FROM JUMPER RACEWAYS

(75) Inventors: Stephen J. Weinert, Arlington, TX (US); Edward C. Granger, Torrington, CT (US); Michael L. Yeilding, Fremont, CA (US)

(73) Assignee: SBC Knowledge Ventures, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/167,815

(22) Filed: Jun. 27, 2005

Related U.S. Application Data

(63) Continuation of application No. 11/093,354, filed on Mar. 30, 2005, which is a continuation of application No. 11/025,303, filed on Dec. 29, 2004, now Pat. No. 6,951,986.

(51) Int. Cl.
*G02B 6/00* (2006.01)
*H02G 3/04* (2006.01)

(52) U.S. Cl. ............... 174/135; 174/48; 174/72 R; 174/101; 385/134; 385/135

(58) Field of Classification Search ............ 174/48, 174/49, 68.1, 68.3, 70 A, 71 R, 72 A, 72 C, 174/72 R, 101, 135; 385/134, 135, 136, 385/137, 147; 248/49, 61
See application file for complete search history.

(56) References Cited

U.S. PATENT DOCUMENTS

| | | | |
|---|---|---|---|
| 3,351,699 A | 11/1967 | Merckle | |
| 5,067,678 A * | 11/1991 | Henneberger et al. | 248/68.1 |
| 5,806,811 A | 9/1998 | Viklund et al. | |
| 5,923,753 A | 7/1999 | Haataja et al. | |
| 5,937,131 A | 8/1999 | Haataja et al. | |
| 6,192,181 B1 | 2/2001 | Haataja et al. | |
| 6,448,495 B1 | 9/2002 | Mattei | |
| 6,450,458 B1 * | 9/2002 | Bernard | 248/68.1 |
| 6,476,327 B1 | 11/2002 | Bernard et al. | |
| 6,494,414 B1 | 12/2002 | Benito-Navazo | |
| 6,522,823 B1 | 2/2003 | Wentworth et al. | |
| 6,535,681 B1 | 3/2003 | Daoud et al. | |
| 6,535,683 B1 | 3/2003 | Johnson et al. | |
| 6,541,704 B1 | 4/2003 | Levenson et al. | |
| 6,559,378 B1 | 5/2003 | Bernard | |
| 6,597,854 B1 | 7/2003 | Haataja et al. | |
| 6,625,373 B1 | 9/2003 | Wentworth et al. | |
| 6,631,875 B1 | 10/2003 | Kampf et al. | |
| 6,668,123 B1 | 12/2003 | Ellison et al. | |
| 6,710,250 B1 | 3/2004 | Dunne et al. | |
| 6,728,461 B1 | 4/2004 | Senatore et al. | |
| 6,728,462 B1 | 4/2004 | Wu et al. | |

(Continued)

*Primary Examiner*—Dean A. Reichard
*Assistant Examiner*—Adolfo Nino
(74) *Attorney, Agent, or Firm*—Brooks Kushman P.C.

(57) ABSTRACT

A device for routing jumper cables includes a conduit connected to a raceway containing multiple jumper cables to form a routing conduit assembly. The conduit has a slit for receiving jumper cables. The conduit includes a hood conduit portion, a curved neck conduit portion, and a vertical body conduit portion. Each conduit portion has a slit portion for receiving jumper cables. The conduit slit portions receive jumpers from the raceway for the conduit to enclose and route between the raceway and fiber optic equipment located below the raceway such that the jumper cables transition between horizontal and vertical orientations while maintaining a minimum bend radius.

18 Claims, 3 Drawing Sheets

U.S. PATENT DOCUMENTS 6,756,539 B1 *  6/2004  VanderVelde ............... 174/48
6,763,169 B1     7/2004  Wentworth et al.
2002/0094184 A1  7/2002  Mattei et al.
2004/0231874 A1  11/2004 Caveney et al.

* cited by examiner

ADJUSTABLE ROUTING DEVICE FOR ROUTING JUMPERS FROM JUMPER RACEWAYS

CROSS-REFERENCE TO RELATED APPLICATIONS

This application is a continuation of U.S. application Ser. No. 11/093,354, filed Mar. 30, 2005, which is a continuation of U.S. application Ser. No. 11/025,303, filed Dec. 29, 2004, now U.S. Pat. No. 6,951,986; the disclosures of which are hereby incorporated by reference in their entirety.

BACKGROUND OF THE INVENTION

1. Field of the Invention

The present invention generally relates to mechanisms for routing and supporting fiber optic jumpers and, more particularly, to an adjustable routing device for routing jumpers from fiber optic jumper raceways.

2. Background Art

Fiber optic troughs or raceways carry and route fiber optic cables such as fiber optic jumpers. The raceways are typically located overhead and horizontally extend over the location of fiber optic equipment such as distribution frames and bays in a facility. The raceways are generally top-opening metal or plastic troughs similar in configuration to rain gutters. Jumpers placed inside the raceways run along the raceways from point-to-point. The raceways protect the jumpers from damage while permitting access for modification, maintenance, connection, and repair.

Jumpers exit the raceways to connect with fiber optic equipment located beneath the raceways. Jumpers exit from raceways by extending over side walls of the raceways. At these raceway exit points, the jumpers are exposed and, as a result, are susceptible to damage. Further, at these raceway exit points, the jumpers are susceptible to being bent beyond a minium curvature radius. Jumpers should not be bent in a radius of less than 1.5 inches. Thus, routing devices at raceway exit points for routing jumpers are required to cover and enclose the jumpers from exposure and to guide and support the jumpers from bending and crimping.

In the past, a raceway was installed as a complete horizontal route lacking the ability to provide waterfall or reroute raceway exit point features for the jumpers to established paths. The raceway was cut-out at a raceway exit point in order to provide an opening for jumpers to exit the raceway. Typically, a new raceway component portion or junction was then inserted in place of the cut-out. Then, appropriate tie-down components such as screw-downs and snap-lock pieces would be used to assemble the new raceway component portion to the raceway. This method is considered dangerous for the jumpers already in place in the raceway. Further, the costs to insert raceway component junctions were compounded with the requirement of providing additional strength members to hold up the horizontal raceway that had been cleaved into two segments at raceway exit points.

Routing devices such as exit troughs have been used for raceways. Exit troughs provide raceway exit points without cutting-out the raceways thereby keeping the raceways intact. Exit troughs permit the interconnection of square vertical troughs to route a relatively large number of jumpers from the raceways to fiber optic equipment. Exit troughs typically have detachable covers that are lifted to place jumpers from the raceway onto the exit troughs. The covers and the exit troughs enclose the jumpers for protection.

A problem with such exit troughs is that they are typically configured to route a relatively large number of jumpers from a raceway exit point to fiber optic equipment at a given location. Frequently, it is desirable to route a smaller number of jumpers from many different raceway exit points to fiber optic equipment at many different locations. Another problem with such exit troughs is the detachable covers required for enclosing the jumpers. The covers are opened each time jumpers are placed in the exit troughs. As such, the covers could become permanently detached or lost from the exit troughs.

DETAILED DESCRIPTION OF THE PREFERRED EMBODIMENT(S)

Figure 1:
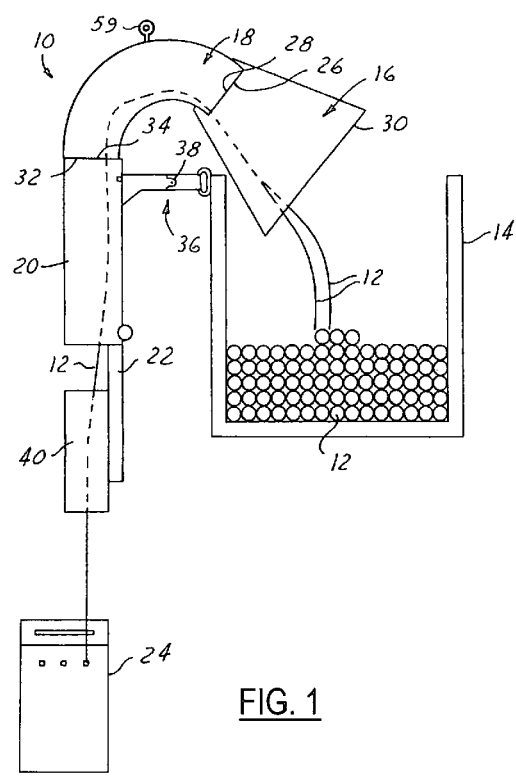
FIG. 1 illustrates a side view of an adjustable routing device for routing fiber optic jumpers from a raceway in accordance with an embodiment of the present invention.

An adjustable routing device for routing fiber optic jumpers from fiber optic jumper raceways in accordance with the present invention has many advantages. In general, the routing device receives jumpers from a raceway and transitions the jumpers to relatively small, compartmentalized feeder routes and then to respective fiber optic equipment bays and relay racks. As such, the routing device is configured to permit a relatively small amount of jumpers to be routed at raceway exit points from the raceway to fiber optic equipment. Accordingly, the amount of jumpers routed by the routing device to the fiber optic equipment is a more realistic amount suitable to the requirements of fiber optic equipment.

The routing device quickly snaps to the lip of a raceway. The routing device permits jumpers from the raceway to be quickly inserted through a slit or slot on top and exterior sides of the routing device in order to be routed through the routing device. The routing device encloses jumpers once the jumpers are inserted into the routing device through the slit. As such, the routing device does not have a detachable cover that is opened each time jumpers are inserted into the routing device.

The routing device generally represents a small-form type waterfall for jumpers which can be installed "on-the-fly" without the need for engineering the placement in advance. In addition, with the slit openings on the routing device for receiving jumpers, the placement of jumpers for circuit activity is done relatively easy without the need to remove, open, and keep up with a detachable cover.

The routing device provides a simple and inexpensive means of providing a raceway exit outlet for jumpers over the side of a raceway without requiring any modification to the raceway itself. The routing device is easily movable, adaptable to different raceway sizes and configurations, and provides necessary support and bend restrictions to the jumpers. As a result, the routing device is useable with any standardized raceway manufactured in either steel or plastic molded variants.

The routing device generally includes a set of interconnected fiber optic jumper conduits and a vertical support stabilizer. The conduits include an adjustable hood or trumpet bell conduit, a curved neck conduit, and a vertical body conduit. The conduits have slits for receiving jumpers at any one time. The slits on the conduits are in alignment with one another to enable a small amount of jumpers to be inserted into the conduits in one insertion motion. The conduits enclose jumpers upon the jumpers being inserted into the conduits through the slits.

The hood conduit connects with one end of the neck conduit to be positioned over the raceway in order to receive jumpers from the raceway when the routing device is mounted to the raceway. The hood conduit is rotatably and telescopically connected to the neck conduit in order to adjust in x, y, and z directions relative to the raceway. The body conduit connects to the other end of the neck conduit.

A connector spring mounts the body conduit to the raceway in order to mount the routing device to the raceway. A middle portion of the connector preferably is configured to act as a fulcrum in order to allow tilting of the routing device relative to the raceway.

In operation, jumpers from the raceway are inserted into the slits of the conduits to be enclosed and routed by the conduits. The conduits route the jumpers from the raceway such that the jumpers traverse from the hood conduit to the neck conduit to the body conduit. The jumpers then exit from the body conduit in order to connect with fiber optic equipment. Of course, the conduits also route jumpers from the fiber optic equipment to the raceway. In this case, the jumpers traverse from the fiber optic equipment to the body conduit to the neck conduit to the hood conduit. The jumpers then exit from the hood conduit into the raceway.

The conduits are configured to route jumpers between horizontal and vertical orientations. That is, the raceway is horizontally oriented and the jumpers are vertically routed from this horizontal orientation down to the fiber optic equipment beneath the raceway. To this end, the hood and neck conduits function to transition the jumpers between horizontal and vertical orientations. The hood and neck conduits have bend radii sufficiently large enough to maintain the minimum bend radius of the jumpers. The body conduit is generally straight and, consequently, does not bend the routed jumpers. Accordingly, in either path between the raceway and the fiber optic equipment, the conduits route the jumpers such that the jumpers maintain the minimum bend radius.

The support stabilizer connects with the body conduit. The support stabilizer has snap and/or hook-and-loop fastener attachments for smaller tube containment systems. The tube containment systems mounted to the support stabilizer receive and route the jumpers between the routing device and the fiber distribution equipment.

Referring now to FIG. 1, a side view of an adjustable routing device 10 for routing fiber optic jumpers 12 from a fiber optic raceway 14 in accordance with an embodiment of the present invention is shown. Routing device 10 generally includes a series of conduits including an adjustable hood or trumpet conduit 16, a curved neck conduit 18, and a vertical body conduit 20. Routing device 10 further includes a vertical support stabilizer 22.

Hood, neck, and body conduits 16, 18, 20 interconnect with one another to form a routing conduit assembly for routing jumpers 12 between raceway 14 and fiber optic equipment 24. The routing conduit assembly transitions jumpers 12 between horizontal and vertical orientations while maintaining the minimum bend radius requirement for the jumpers. Hood, neck, and body conduits 16, 18, 20 have slits for receiving jumpers 12 at any one time. Hood, neck, and body conduits 16, 18, 20 enclose jumpers 12 upon these jumpers being inserted into the conduits through the slits. Jumpers 12 inserted in hood, neck, and body conduits 16, 18, 20 run into/out of hood conduit 16 through neck conduit 18 and out of/into body conduit 20.

A first end 26 of hood conduit 16 connects with a first end 28 of neck conduit 18. A second end 30 of hood conduit 16 is positioned over raceway 14 to receive jumpers 12 from the raceway when routing device 10 is mounted to the raceway. First hood conduit end 26 is rotatably and telescopically connected to first neck conduit end 28 in order to enable hood conduit 16 to be adjustable in x, y, and z directions relative to raceway 14. A first end 32 of body conduit 20 connects to a second end 34 of neck conduit 18 using adhesive, bolts, and the like.

A connector 36 spring mounts body conduit 20 to raceway 14 in order to mount routing device 10 to the raceway. A middle portion 38 of connector 36 acts as a fulcrum to allow a tilting adjustment of routing device 10 relative to raceway 14. Connector 36 generally has a key at one end for being inserted into a key slot of body conduit 20 in order to connect with the body conduit. Connector 36 generally has a snap or the like at its other end to snap to or leverage over raceway 14 in order to connect with the raceway.

Jumpers 12 from raceway 14 are inserted into the slits of hood, neck, and body conduits 16, 18, 20 in order to be enclosed and routed by the conduits. Hood, neck, and body conduits 16, 18, 20 route jumpers 12 from raceway 14 such that the routed jumpers traverse from the hood conduit to the neck conduit to the body conduit. Jumpers 12 then exit from body conduit 20 in order to connect with fiber optic equipment 24. Hood, neck, and body conduits 16, 18, 20 also route jumpers 12 from fiber optic equipment 24 to raceway 14. In this case, jumpers 12 traverse from fiber optic equipment 24 to body conduit 20 to neck conduit 18 to hood conduit 16. Jumpers 12 then exit from hood conduit 16 into raceway 14.

Hood, neck, and body conduits 16, 18, 20 are configured to route jumpers 12 between horizontal and vertical orientations. Hood, neck, and body conduits 16, 18, 20 transition jumpers from a horizontal orientation in raceway 14 vertically down to fiber optic equipment 24 beneath the raceway. Hood and neck conduits 16, 18 transition jumpers 12 between horizontal and vertical orientations whereas body conduit 20 maintains a vertical orientation of the jumpers. Hood and neck conduits 16, 18 have bend radii sufficiently large enough to maintain the minimum bend radius of jumpers 12. In particular, neck conduit 18 which transitions jumpers between horizontal and vertical orientations is configured to have a bend radius of at least 1.5 inches. Accordingly, in either path between raceway 14 and fiber optic equipment 24, hood, neck, and body conduits 16, 18, 20 maintain the minimum bend radius.

Support stabilizer 22 connects with body conduit 20 using adhesive, bolts, and the like. Support stabilizer 22 provides for snap-in and/or hook-and-loop fastener attachments for smaller fiber optic jumper tube containers 40. Tube containers 40 mounted to support stabilizer 22 receive and route jumpers 12 between routing device 10 and fiber distribution equipment 24. As such, jumpers 12 feed from body conduit 20 into a top end of a tubular container 40. These jumpers 12 then feed out from a bottom end of tubular container 40 to fiber optic equipment 24. Likewise, jumpers 12 feed from fiber optic equipment 24 to the bottom end of tubular container 40. These jumpers 12 then feed out from the top end of tubular container 40 to body conduit 20.

Figure 2:
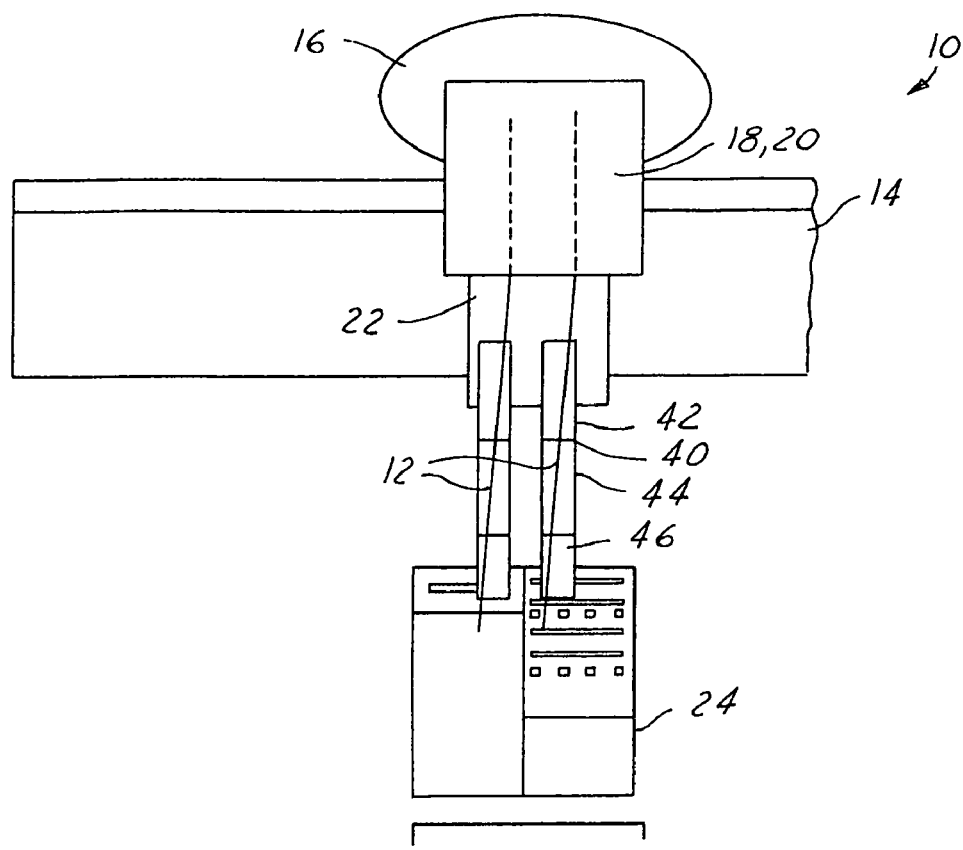
FIG. 2 illustrates a frontal view of the adjustable routing device shown in FIG. 1.

Referring now to FIG. 2, with continual reference to FIG. 1, a frontal view of adjustable routing device 10 is shown. Again, routing device 10 connects with raceway 14 in order to position hood 16 for receiving jumpers 12 from the raceway. In order to provide a proper posture for receiving jumpers 12 from raceway 14, hood conduit 16 connects with neck conduit 18 such that the hood conduit is rotatably and telescopically movable relative to the raceway. The proper posture enables jumpers 12 to maintain a minium bend radius when entering and exiting hood conduit 16. As such, hood conduit 16 is adjustable to conform to different raceway configurations.

Hood conduit 16 represents the front end of routing device 10 and is an entry point for receiving jumpers 12 from raceway 14. As described, hood conduit 16 is adjustable to match any unique adjustments required when jumper routing moves from horizontal raceway 14 to the "waterfall route" provided by routing device 10. Hood conduit 16 ratchets up to two inches on x, y, and z axes in order to adjust its position relative to raceway 14. In any position, hood conduit 16 (like neck conduit 18) maintains the minimum bend radius for jumpers 12 at all times without any kinks or abbreviated bend radii.

Support stabilizer 22 which connects with body conduit 20 generally provides for tube and hose routing to fiber optic equipment bays and relay racks 24. Tubular containers 40 connect to support stabilizer 22. To this end, support stabilizer 22 includes receptacles for receiving snaps of tubular containers 40. In this case, the snap of a tubular container 40 snaps into a receptacle on support stabilizer 22 in order for the tubular container to be connected to the support stabilizer. Alternatively or additionally, support stabilizer 22 and tubular containers 40 include hook-and-loop fastener receiving means for being connected to one another.

Tubular containers 40 mount to support stabilizer 22 in order to route jumpers 12 between routing device 10 and fiber optic equipment 24. A tubular container 40 is preferably formed of a plurality of interconnected tubular segments 42, 44, 46. Tubular segments 42, 44, 46 interconnect with one another using latching arrangements and the like. As shown in FIG. 2, tubular segment 42 mounts to support stabilizer 22 and tubular segment 46 connects with fiber optic equipment 24. Tubular segment 46 connects with surfaces of fiber optic equipment 24 using telephone adhesive, screw-in bolts, etc. As a result, tubular container 40 directly routes jumpers 12 between routing device 10 and fiber optic equipment 24. Tubular container 40 encloses and protects jumpers 12 routed between routing device 10 and fiber optic equipment 24.

In general, support stabilizer 22 is a vertical support stabilizer or rear-stabilizer component which aligns and secures other fiber protection tubing and materials of various sizes and configurations (such as tubular containers 40) once the transition from horizontal raceway 14 has occurred. Support stabilizer 22 adheres to the back of body conduit 20 in order to provide both stability while providing the ability for three-axis movement due to the requirements of earthquake areas. The three-axis movement enables tubular containers 40 and jumpers 12 placed therein to have some play or movement in response to earthquake vibrations or other like disruptions.

As described, a tubular container 40 generally includes tubular segments such as tubular segments 42, 44, 46 having circular cross-sections. The tubular segments are provided in various configurations, shapes, and sizes including straight, curved, S-bend, etc., tubular segments. The tubular segments have a longitudinal slit running along one side which can be easily pried apart by an operator for placement of jumpers 12 within the tubular segments. The sides of a tubular segment around a slit close towards the slit once the operator pressure has been removed in order to house jumpers 12 therein. Jumpers 12 placed inside a tubular segment run longitudinally into one end of the tubular segment and out the other end of the tubular segment.

The tubular segments are made of supportive materials such as plastic and provide protection to jumpers 12 encased therein while allowing the jumpers to move or slide freely in relation to one another. Each tubular segment is malleable to permit slight bending in order to avoid any rigid shear tearing or ripping motions while maintaining the minimum bend radius required for jumpers 12.

Figure 3:
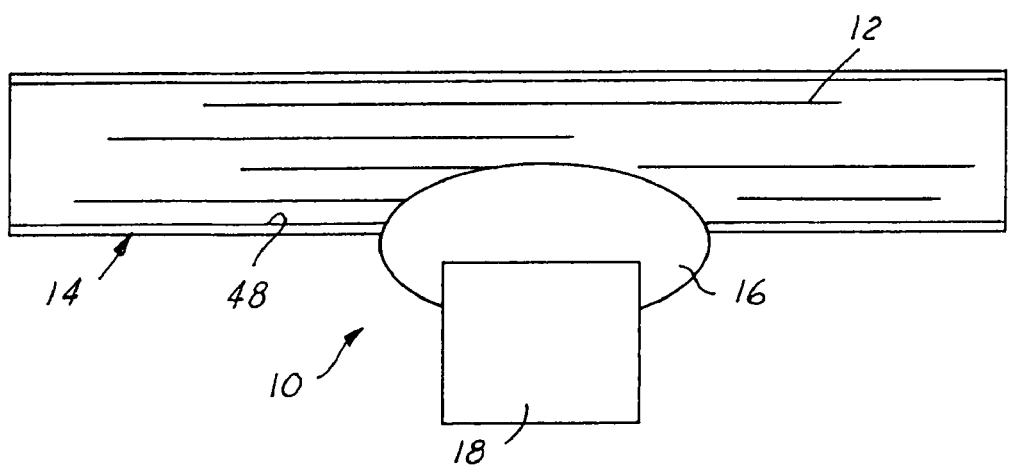
FIG. 3 illustrates a top view of the adjustable routing device shown in FIG. 1.

Referring now to FIG. 3, with continual reference to FIGS. 1 and 2, a top view of adjustable routing device 10 is shown. As shown in FIG. 3, hood conduit 16 is positioned over the top edge of a side wall 48 of raceway 14 in order to provide raceway entry and exit points for jumpers 12. Hood conduit 16 is positioned over raceway 14 such that it does not come into direct physical contact with raceway 14 (best shown in FIG. 1).

Figure 4:
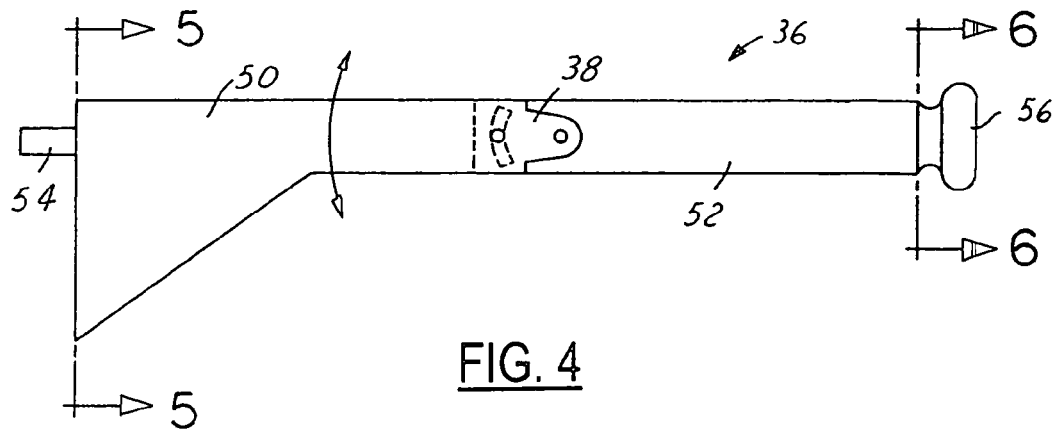
FIG. 4 illustrates a side view of the connector for connecting the adjustable routing device to a raceway.

Referring now to FIG. 4, with continual reference to FIG. 1, a side view of connector 36 for connecting adjustable routing device 10 to raceway 14 is shown. Connector 36 spring mounts body conduit 20 to raceway 14 in order to mount the routing device to the raceway. Connector 36 includes two support portions 50, 52 connected by a middle portion 38. Support portion 50 connects with body conduit 20 and support portion 52 connects with raceway 14. Middle portion 38 acts as a fulcrum to allow support portion 50 to be tilted relative to support portion 52. Consequently, a tilting adjustment of routing device 10 relative to raceway 14 is available by tilting support portion 50 relative to support portion 52. Middle portion 38 may include rotatable knob mechanisms and the like configured to lock and unlock middle portion 38 and, consequently, lock and unlock support portions 50, 52 in place.

Figure 5:
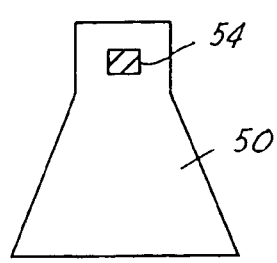
FIG. 5 illustrates an end view of the connector along the line 4—4 in FIG. 4.
Figure 6:
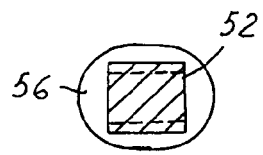
FIG. 6 illustrates an end view of the connector along the line 5—5 in FIG. 4.
Figure 7:
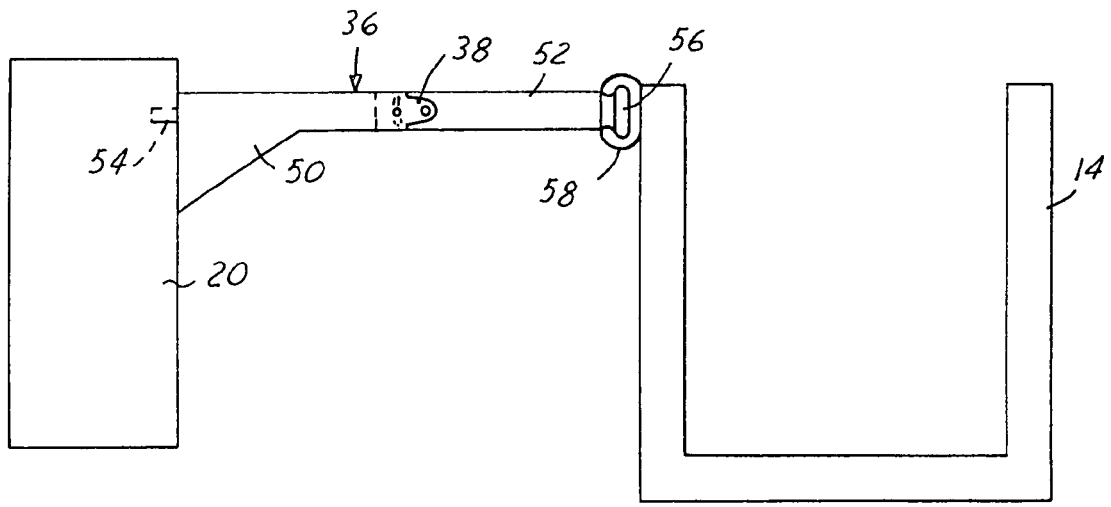
FIG. 7 illustrates a side view of the connection made by the connector between the adjustable routing device and a raceway.

As shown in FIGS. 4, 5 and 7, support portion 50 has a key 54 at its end. Key 54 inserts into a key slot of body conduit 20 in order to connect connector 36 to the body conduit. As shown in FIGS. 5, 6, and 7, support portion 52 has a snap 56 at its end. Snap 56 snaps into a lip 58 of raceway 14 in order to connect connector 36 to the raceway. Alternatively, support portion 52 has a U-clip or the like at its end. This is useful if raceway 14 lacks lip 58. In this case, the U-clip leverages on the top edge of side wall 48 of raceway 14 in order to connect with the raceway.

As described, connector 36 mounts routing device 10 to raceway 14. For additional support of routing device 10, neck conduit 18 includes an eyelet 59 (shown in FIG. 1) for receiving a support cable. The support cable mounts to the facility ceiling in which routing device 10 and raceway 14 are located in order to support the weight of the routing device. In this configuration, support portion 50 is still able to tilt relative to support portion 52 at middle portion 50 in order to tilt routing device 10 relative to raceway 14.

Figure 8:
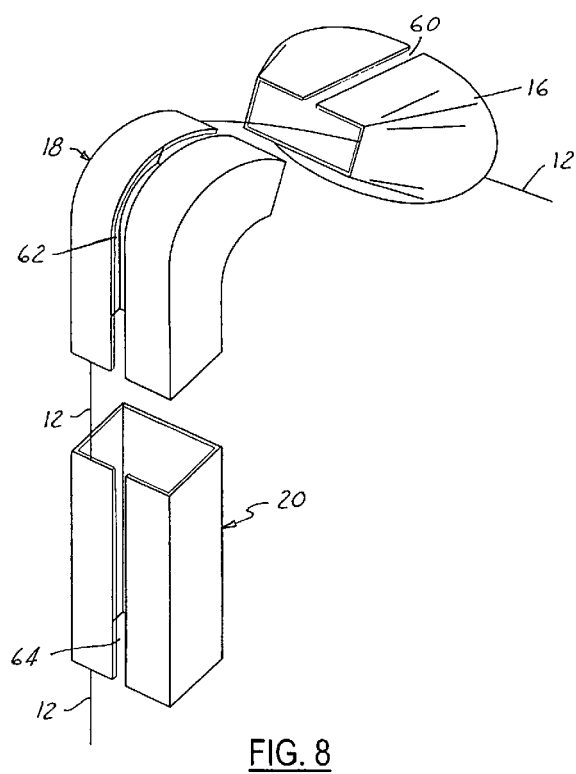
FIG. 8 illustrates an exploded perspective view of the fiber optic jumper conduits of the adjustable routing device.

Referring now to FIG. 8, an exploded perspective view of hood, neck, and body conduits 16, 18, 20 of adjustable routing device 10 is shown. The view shown in FIG. 8 is along the back and exposed side of conduits 16, 18, 20. As described above, conduits 16, 18, 20 include respective slits or slots 60, 62, 64 for receiving jumpers 12. Slits 60, 62, 64 are located on the back and exposed side of conduits 16, 18, 20. Slits 60, 62, 64 generally provide an opening for jumpers 12 to be inserted into conduits 16, 18, 20 without having to have fiber optic jumper connectors of the jumpers be inserted through the ends of the conduits.

Jumpers 12 are inserted into conduits 16, 18, 20 through the respective slits 60, 62, 64 at any one time. Slits 60, 62, 64 are in alignment with one another to enable a small amount of jumpers 12 to be inserted into conduits 16, 18, 20 in one insertion motion. Slit 60 of hood conduit 16 maintains alignment with slit 62 of neck conduit 18 as the position of the hood conduit is adjusted in x, y, and z positions. Conduits 16, 18, 20 enclose jumpers 12 upon the jumpers being inserted into the conduits through slits 60, 62, 64.

Thus, it is apparent that there has been provided, in accordance with the present invention, an adjustable routing device for routing fiber optic jumpers from fiber optic jumper raceways that fully satisfies the objects, aims, and advantages set forth above. While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A device for routing jumper cables, the device comprising:
a conduit connectable to a horizontally oriented raceway containing multiple jumper cables to form a routing conduit assembly, wherein the conduit has a slit for receiving jumper cables, wherein the conduit includes a hood conduit portion, a curved neck conduit portion, and a vertical body conduit portion, wherein the conduit portions have respective slit portions which form the slit of the conduit.

2. The device of claim 1 further comprising:
a connector which connects the vertical body conduit portion to the raceway in order to connect the conduit to the raceway.

3. The device of claim 2 wherein:
the connector includes a snap and the raceway includes a lip, wherein the snap snaps into the lip in order to connect the conduit to the raceway.

4. The device of claim 1 wherein:
the hood conduit portion rotatably and telescopically connects to the curved neck conduit portion such that the hood conduit portion is adjustable in x, y, and z axes.

5. The device of claim 1 further comprising:
a support stabilizer connected to the vertical body conduit portion for receiving tubular containers.

6. The device of claim 5 further comprising:
a first tubular container mounted to the support stabilizer in a first alignment, wherein the first tubular container receives from the vertical body conduit portion a first jumper cable routed by the routing conduit assembly and routes the first jumper cable to fiber optic equipment located below the raceway.

7. The device of claim 6 wherein:
the first tubular container is mounted between the support stabilizer and the fiber optic equipment in order for the first tubular container to directly route the first jumper cable to the fiber optic equipment.

8. The device of claim 6 further comprising:
a second tubular container mounted to the support stabilizer in a second alignment different from the first alignment, wherein the second tubular container receives from the vertical body conduit portion a second jumper cable routed by the routing conduit assembly and routes the second jumper to the fiber optic equipment.

9. A device for routing jumper cables, the device comprising:
a conduit connectable to a horizontally oriented raceway containing multiple jumper cables to form a routing conduit assembly for transitioning the jumper cables between horizontal and vertical orientations while maintaining a minimum bend radius, wherein the conduit has a slit for receiving jumper cables, wherein the conduit includes a hood conduit portion, a curved neck conduit portion, and a vertical body conduit portion, wherein the conduit portions have respective slit portions which form the slit of the conduit.

10. The device of claim 9 further comprising:
a connector which connects the vertical body conduit portion to the raceway in order to connect the conduit to the raceway.

11. The device of claim 10 wherein:
the connector includes a snap and the raceway includes a lip, wherein the snap snaps into the lip in order to connect the conduit to the raceway.

12. The device of claim 9 wherein:
the hood conduit portion rotatably and telescopically connects to the curved neck conduit portion such that the hood conduit portion is adjustable in x, y, and z axes.

13. The device of claim 9 further comprising:
a support stabilizer connected to the vertical body conduit portion for receiving tubular containers;
a first tubular container mounted to the support stabilizer in a first alignment, wherein the first tubular container receives from the vertical body conduit portion a first jumper cable routed by the routing conduit assembly and routes the first jumper cable to fiber optic equipment located below the raceway; and
a second tubular container mounted to the support stabilizer in a second alignment different from the first alignment, wherein the second tubular container receives from the vertical body conduit portion a second jumper cable routed by the routing conduit assembly and routes the second jumper to the fiber optic equipment.

14. A device for routing jumper cables, the device comprising:
a conduit assembly connectable to a raceway containing jumper cables, wherein the conduit assembly includes a hood conduit, a curved neck conduit, and a vertical body conduit connected to one another, wherein each conduit has a slit for receiving jumper cables, wherein the hood conduit rotatably and telescopically connects to the curved neck conduit such that the hood conduit is adjustable in x, y, and z axes.

15. The device of claim 14 wherein:
the raceway is horizontally oriented.

16. The device of claim 14 further comprising:
a connector which connects one of the conduits to the raceway in order to connect the conduit assembly to the raceway.

17. The device of claim 14 wherein:
the conduit assembly includes a hood conduit and a neck conduit.

18. The device of claim 17 wherein:
the conduit assembly further includes a body conduit.

* * * * *